Patented Mar. 21, 1944

2,344,676

UNITED STATES PATENT OFFICE 2,344,676

PROCESS FOR PRODUCING A RESIN OF THE INDENE - STYRENE - HOMOLOG COUMARONE TYPE

Edwin Louis Cline, Philadelphia, Pa., assignor, by mesne assignments, to Allied Chemical & Dye Corporation, a corporation of New York No Drawing. Application July 19, 1940, Serial No. 346,292

9 Claims. (Cl. 260—81)

This invention relates to a method of processing oils containing resinogenic constituents and to the resins thereby produced.

Resinous products are produced by treating oils containing polymerizable substances such as coumarone, indene, styrene, their homologs and similar resin-forming substances to polymerize the resin-forming constituents. In order to obtain effective polymerization of an oil in which the major proportion of polymerizable constituents consists of substances boiling above styrene, e. g. coumarone, indene and homologs of styrene, it has usually been found necessary, for complete utilization of the resin-forming constituents, to carry out the polymerization with the aid of catalysts such as sulfuric acid, metallic chlorides and other substances promoting polymerization. I have found, however, that with oils containing homologs of styrene as a substantial proportion of the polymerizable constituents, the resin produced by prior art methods is often dark-colored and has too low a melting point to be useful industrially, e. g. in varnish and mastic tile production.

It is an object of my invention to provide a novel method for improving the quality of resin obtained from resin oils containing a substantial proportion of styrene homologs.

I have discovered a high melting, light-colored resin may be produced by subjecting an oil in which the major part of the polymerizable constituents consists of substances boiling above styrene, e. g. indene, coumarone, styrene homologs and similar substances, and in which about 20% or more of the polymerizable constituents consist of styrene homologs, e. g. methyl styrenes and dimethyl styrenes, to partial polymerization by means of heat alone, subjecting to catalytic polymerization the unpolymerized portion of the oil thus partially polymerized by means of heat, and blending the heat polymer and catalyst polymer thus formed.

In the preferred practice of my invention I have found it advantageous to polymerize between about 20% and 60%, preferably about 40%, of the available polymerizable constituents during the heat polymerization step.

There can be produced, by this method, blended resins superior to the resin that would be obtained either by complete catalytic polymerization or complete heat polymerization of the above-described oil. Blended resins, substantially water-white in color, can be prepared with melting points above 130° C. These resins have the further important property of being compatible with stearin pitch. Compatibility of the resin with stearin pitch is important in industrial operations, particularly in the manufacture of binders employed to produce tile used in the construction of floors, walls and roofs. In the manufacture of such tile, blends of resins of the paracoumarone indene type with stearin pitch have found wide application because such blends have the necessary adhesive properties and result in tile having physical properties and aging characteristics which are as good as or better than tile made with other binders hitherto practically available. Resins within the commercially important melting point range, 115° C. to 130° C., and colors lighter than approximately C-5 on the customary resin scale can readily be made.

The customary resin scale herein mentioned is made by mixing three stock solutions in the proportions indicated in the following table, thereby obtaining the colors indicated in this table; namely, stock solution A constituted of 40 cc. of 33.5% hydrochloric acid and 1560 cc. of water; stock solution B made by triturating 450 grams of C. P. ferric chloride ($FeCl_3.6H_2O$), 270 cc. of solution A and filtering, using the clear filtrate for stock solution B; and stock solution C made by triturating 60 grams of C. P. cobalt chloride ($CoCl_2.6H_2O$) and 60 cc. of solution A and filtering, using the filtrate for stock solution C.

*Volumes in cubic centimeters*

| Number | (A) | (B) | (C) | Water | Standard "C" Series |
|---|---|---|---|---|---|
| C ⅛ | 18 | | | | 6 of #½. |
| C ¼ | 12 | | | | 12 of #½. |
| C ⅜ | 6 | | | | 18 of #½. |
| C ½ | 125 | 0.5 | 0.50 | | |
| C ¾ | | | | | 12 of #½ plus 12 of #1. |
| C 1 | 125 | 1.0 | 0.75 | | |
| C 1¼ | | | | | 12 of #1 plus 12 of #1½. |
| C 1½ | 125 | 1.4 | 0.95 | | |
| C 2 | 125 | 2.0 | 1.25 | | |
| C 2½ | 125 | 2.8 | 1.60 | | |
| C 3 | 125 | 4.0 | 2.00 | | |
| C 3½ | 15 | 6.0 | 2.00 | 110 | |
| C 4 | 15 | 8.0 | 2.00 | 110 | |
| C 5 | 15 | 10.0 | 2.75 | 85 | |
| C 6 | 10 | 20.0 | 5.00 | 90 | |
| C 7 | | 40.0 | 7.50 | 100 | |
| C 8 | | 65.0 | 5.00 | 50 | |
| C 9 | | 125.0 | 10.00 | 27.5 | |
| C 10 | | 125.0 | 10.00 | | |

The solutions should be mixed well and about 25-28 cc. of each of the above indicated mixtures placed in a 1 oz. test bottle, each bottle labeled with its number, and the bottle sealed with sealing wax to prevent evaporation of water and HCl.

To determine the color of a resin, a 2 gram sample thereof is dissolved in 25 cc. of benzol and the depth of the color of the resin solution thus produced is compared with the standard colors. If the sample lies between two consecutive numbers, its color is reported as the higher one.

Catalytic polymerization alone of an oil in which 20% or more of the polymerizable constituents are styrene homologs I have found is not effective for commercial production of a resin melting in the range 115° to 130° C.; moreover, such a resin has a dark color, i. e. about C-9 on the aforesaid customary resin scale. Polymerization by heat alone of substantially all the polymerizable constituents of such an oil would result in a dark colored resin melting below 115° C. I have found the resin obtained by preparing both a heat polymer and a catalyst polymer from an oil of the above-described character and blending the two is surprisingly superior to a resin resulting from either catalytic or heat polymerization alone.

The above described oils suitable for the process of my invention in which the major part of the polymerizable constituents consists of substances boiling above styrene, e. g. indene, coumarone. styrene homologs and similar substances, and in which about 20% or more of the polymerizable constituents consist of styrene homologs, e. g. methyl styrenes and dimethyl styrenes, include distillate cuts of drip oil (the oil condensed in the mains through which coal distillation gas or water gas is passed) of the boiling range of about 150° to 205° C., similar cuts of water gas light oil (the light oil distilled from carburetted water gas wash oils), oils obtained by cracking and reforming petroleum oils, and similar oils.

The partial heat polymerization may be carried out in various ways; for example, the resin oil may be refluxed at its boiling point or may be heated at temperatures above or below its boiling point, under pressure if desired. Moreover, air may be excluded during the heat polymerization of the oil, e. g. by use of a carbon dioxide atmosphere. Exclusion of air has been found to give a lighter colored resin.

The extent of heat polymerization was found to vary with the time of heating. For example, when drip oil "crude hi-flash" (the fraction of drip oil containing primarily indene, coumarone and homologs of styrene as polymerizable constituents) was heated at about 170° to 185° C., it was found 40% of the total available polymerizable constituents were polymerized by heating for 16 hours, 50% by heating for 30 hours.

The melting point of the heat polymer and the blended resin produced therefrom may be modified by changing the conditions under which the heat polymerization is carried out. For example, I have found the melting point may depend upon the temperature of polymerization. When polymerization of drip oil "crude hi-flash" is carried out in the range 170° to 185° C., the heat polymer has a melting point in the range 130° to 140° C. When polymerization is carried out at a temperature of about 200° C. the resin produced melts at about 124° C. In general, higher temperature of polymerization results in production of a heat polymer of lower melting point. Heat polymerization in accordance with my invention may be carried out in the temperature range of about 150° to 200° C., preferably about 170° to 185° C.

Before carrying out the partial heat polymerization in accordance with this invention, the resin oil may be fractionated to distill off color-forming bodies such as cyclopentadiene and other low boiling constituents of the oil tending to lower the quality of the resin produced. Such fractionation is preferably carried out under atmospheric pressure to insure heating the oil to a sufficiently high temperature to decompose polymers of cyclopentadiene and other low boiling color-forming bodies. The fractionation to remove low boiling constituents may, if desired, be combined with the partial heat polymerization operation; for example, in the preferred operation of my process the resin oil is heated in a column still at atmospheric pressure to effect partial heat polymerization, and low boiling color-forming bodies are removed by distillation in the early stages of the heat polymerization.

The heat polymer produced as above described may be separated by distilling off the unpolymerized oil. It is desirable to maintain the still temperature below about 190° C. during this distillation, which may be accomplished by employing vacuum or steam distillation or both. Catalytic polymerization of the unpolymerized oil thus recovered as distillate may then be carried out using sulfuric acid, a metallic chloride, activated clay, or other material as catalyst, and the catalyst polymer thus produced is blended with the heat polymer to obtain my improved resin product. Alternatively, catalytic polymerization of the unpolymerized constituents may take place in the presence of the heat polymerized resin, if desired, under conditions such that blending of the heat and catalyst polymerized product takes place.

The solubility of the resin in vegetable or petroleum oil and its compatability with stearin pitch are found to be improved by cutting down the amount of heat-polymerizable material boiling below 150° C. in the original resin oil. It has been found, for example, the presence of a substantial amount of polymerized styrene tends to decrease the vegetable or petroleum oil solubility of the heat-polymerized resin. To obtain a heat-polymerized resin of particularly high oil solubility, it is desirable that the resin oil should contain not more than about 5% of constituents boiling under about 150° C. Accordingly, when resin oils containing a substantial amount of low boiling heat-polymerizable substances such as styrene are employed in the process of my invention, it is desirable to subject the oil to vacuum fractionation to remove all or a portion of the styrene or similar compounds before carrying out the above-described operations.

When very impure resin oils are employed in the process of my invention or when it is desired to produce particularly light colored resins, the oil may be pretreated before carrying out the above described operations to remove impurities in the oil. For example, the impure oil may be treated chemically (e. g. washed with dilute sulfuric acid), or distilled to remove the impurities as residue, or pretreated by both of these methods.

In a preferred method of practicing my invention, a resin oil such as the fraction of drip oil boiling from 150° C. to 205° C. is charged into a column still. If a particularly impure resin oil is employed it may be pretreated by washing with dilute sulfuric acid or distillation, or both, before charging into the column still. When the oil contains a substantial proportion of styrene or other heat-polymerizable material boiling below 150° C., the column still is preferably first operated under vacuum to remove the major part of such low boiling material. The oil is then heated and distilled under atmospheric pressure to bleed out color-forming bodies such as cyclopentadiene and other undesirable low boiling constituents of the oil and to initiate heat polymerization. After the greater part of the low boiling constituents has been removed (usually amounting to about 5% of the oil when the above-described fraction of drip oil is employed in the process of my invention) the column is blanked off and the heating of the oil in the still is continued for the time necessary to carry out the desired degree of heat polymerization.

After the above heat polymerization operation is completed, the mixture in the still is subjected to distillation at a temperature below about 190° C., preferably under vacuum, to remove the unpolymerized oil as distillate, leaving the heat polymer as residue in the still. The distillate, i. e. the unpolymerized oil, may thereupon be subjected to catalytic polymerization; for example, by treating with 66° Bé. sulfuric acid.

The heat polymer and the catalyst polymer are both resins of superior quality and may be blended in any desired proportion to obtain the improved resin product of my invention. The blending of the two resins is preferably carried out by mixing the resins in molten condition at a temperature between 180° and 200° C. with a current of live steam. The mixing may be best accomplished during the customary steam distillation of the resins for removal of heavy, oily polymers. As an alternate method the heat polymer may be dissolved in the catalyst-polymerized distillate. Blended resin may be recovered from the solution by the customary distillation procedure.

As above indicated, blending may be accomplished by carrying out the catalyst polymerization in the presence of the heat-polymerized resin and without effecting a separation of the heat polymer from the unpolymerized constituents. I have found it advantageous to prepare blended resins containing 20 to 60% of the heat polymer. For example, a blended resin consisting of 40% heat polymer and 60% catalyst (sulfuric acid) polymer has been found particularly useful in varnish manufacture and mastic tile production.

The heat polymer, I have found, is derived chiefly but not entirely from the more heat-reactive constituents of the resin oil, e. g. the styrene homologs. For example, one analysis of the heat polymer showed that somewhat more than two-thirds thereof was derived from the more heat-reactive constituents. The catalyst polymer, on the other hand, is derived chiefly from the less heat-reactive constituents of the resin oil, e. g. indene type constituents. An analysis of the catalyst (sulfuric acid) polymer showed that somewhat more than two-thirds thereof was derived from coumarone-indene type constituents. In the blended resin product of this invention made by blending 20 to 60%, preferably 40 to 60%, of the heat polymer with 80 to 40%, preferably 60 to 40%, of the catalyst polymer, 20 to 60%, preferably 40 to 60%, is therefore derived chiefly from the more heat-reactive constituents such as styrene homologs, and 80 to 40%, preferably 60 to 40%, is derived chiefly from the less heat-reactive constituents such as indene.

The resin product of this invention has improved properties as compared with coumarone-indene type resins heretofore produced from drip oil and coke oven crudes. As above indicated, it has a melting point above 115° C. and combines the properties of light color, i. e. lighter than approximately C-5 and preferably lighter than C-3½ on the aforesaid resin scale, excellent solubility in petroleum solvents, and compatibility with stearin pitch to an extent heretofore unknown in coumarone-indene type resins made by heretofore known processes, i. e. such heretofore known resins are lacking in one or more of the above mentioned desirable properties. For example, resins produced in accordance with this invention do not show any clouding at temperatures as low as 0° C. when subjected to the well known Stoddard solvent solubility test, involving preparation of a 25% solution of the resin in Stoddard solvent (a petroleum distillate having a boiling range of approximately 150° to 200° C.). Blends of the resin in the proportion of 60% resin to 40% stearin pitch (cottonseed origin) of 110° F., melting point (R. & B.) subjected to the McBurney-Bowen indentation test, using ¼" indenting point for ten minutes, showed a maximum indentation of 0.150" when tested at 77° F. These results show the resin to combine to an unusual and exceptional extent the desirable properties of lightness in color, excellent solubility in petroleum solvents, and resistance to penetration and deformation.

The following examples are illustrative of the process of my invention. All parts are by volume.

*Example I.*—5000 parts of drip oil "crude hi-flash" were charged to a column still and fractionated at atmospheric pressure until 250 parts of oil had distilled over. The residual material was then refluxed at 180° to 190° C. for 16 hours. At this point 42% of the available polymerizable constituents had been heat-polymerized. The heat-polymerized resin was recovered by distilling off the unpolymerized oil under vacuum up to the appearance of naphthalene in the distillate. The unpolymerized oil was treated with sulfuric acid catalyst in the usual manner to obtain a catalyst polymer. The two resins, each having a color of about C-3, were blended, forming a blended resin of color C-3½ having a melting point of 124° C.

*Example II.*—5000 parts of drip oil "crude hi-flash," abnormally dark in color, were distilled under vacuum until 95% of the oil had passed over as distillate. The distillate was fractionated and polymerized by heating according to the process described in Example I to form a heat polymer of color C-1½. When this was blended with the acid polymer there was obtained a resin of very light color and good solubility in vegetable oil.

*Example III.*—5000 parts of impure drip oil "crude hi-flash" were agitated with 5% by volume of 50° Bé. sulfuric acid for one hour; the acid layer was settled and separated and the oil neutralized with caustic soda solution. The oil was then redistilled under vacuum to produce a substantially colorless distillate. This distillate was fractionated and polymerized to obtain a heat polymer and an acid polymer, as described in Example I; the color of the heat polymer was C-¼ and the acid polymer C-1. When blended, an excellent resin for varnish or mastic tile production was obtained.

*Example IV.*—Drip oil "crude hi-flash" was decolorized by treatment with 50° Bé. sulfuric acid, neutralization and distillation. The decolorized oil was then heated at 180° C. for 16 hours. Rise in specific gravity indicated that 20% of the available resin-forming constituents had been resinified. The partially polymerized oil (100) parts was then treated at 100° C. with clay catalyst (Super-filtrol) (6 parts) for three hours to polymerize remaining unpolymerized constituents and effect in situ a blending of the heat and catalyst polymerized resin products. After filtration to separate the spent clay, the blended resin was recovered from the oil by distillation. The product (42 parts) was a light, brittle resin, color C-¼, melting point 144° C.

Since certain changes may be made in carrying out the above process without departing from the scope of the invention, it is intended that all matter contained in the above description shall be interpreted as illustrative and not in a limiting sense.

What is claimed is:

1. A process for treating the fraction of drip oil of boiling range about 150° to 205° C. which comprises washing the oil with dilute sulfuric acid, distilling the oil to remove impurities as residue, subjecting the oil to vacuum fractionation to remove constituents boiling below about 150° C. at atmospheric pressure, heating the oil at atmospheric pressure to distill off low boiling color-forming bodies, maintaining the oil at a temperature of about 170° to 185° C. to effect polymerization of about 40% of the polymerizable constituents of the oil by means of heat alone, distilling the partially polymerized oil to remove the unpolymerized portion of the oil as distillate while maintaining the temperature below about 190° C. during distillation, subjecting the unpolymerized portion of the oil to catalytic polymerization by means of sulfuric acid, and blending the heat polymer and the acid polymer.

2. In a process for production of a resin from a resin oil in which the major proportion of the polymerizable constituents consists of indene, coumarone, styrene and their homologs, at least 20% being homologs of styrene, the steps that comprise heating the oil to effect polymerization to resin polymer of about 20% to 60% of the polymerizable constituents of the oil by means of heat alone, treating unpolymerized constituents of the oil with a resin-producing catalyst to form catalytic resin polymer, and blending the product of heat polymerization with the product of catalytic polymerization to form a solid blended resin.

3. In a process for production of a resin from a resin oil in which the major proportion of the polymerizable constituents consists of indene, coumarone, styrene and their homologs, at least 20% being homologs of styrene, the steps that comprise heating the oil to effect polymerization to resin polymer of about 20% to 60% of the polymerizable constituents of the oil by means of heat alone, treating unpolymerized constituents of the oil with a sulfuric acid polymerization catalyst to form catalytic resin polymer, and blending the product of heat polymerization with the product of catalytic polymerization to form a solid blended resin.

4. In a process for production of a resin from a resin oil in which the major proportion of the polymerizable constituents consists of indene, coumarone, styrene and their homologs, at least 20% being homologs of styrene, the steps that comprise heating the oil to effect polymerization to resin polymer of about 20% to 60% of the polymerizable constituents of the oil by means of heat alone, treating unpolymerized constituents of the oil with an activated clay polymerization catalyst to form catalytic resin polymer, and blending the product of heat polymerization with the product of catalytic polymerization to form a solid blended resin.

5. In a process for production of a resin from a fraction of drip oil of boiling range from about 150° to 205° C., the steps that comprise heating the oil to effect polymerization to resin polymer of about 20% to 60% of the polymerizable constituents of the oil by means of heat alone, treating unpolymerized constituents of the oil with a resin-producing catalyst to form catalytic resin polymer from substantially all the remaining polymerizable monomer, and blending the product of heat polymerization with the product of catalytic polymerization to form a solid blended resin.

6. In a process for production of a resin from a fraction of water gas light oil of boiling range from about 150° to 205° C., the steps that comprise heating the oil to effect polymerization to resin polymer of about 20% to 60% of the polymerizable constituents of the oil by means of heat alone, treating unpolymerized constituents of the oil with a resin-producing catalyst to form catalytic resin polymer from substantially all the remaining polymerizable monomer, and blending the product of heat polymerization with the product of catalytic polymerization to form a solid blended resin.

7. In a process for production of a resin from a cracked and reformed petroleum oil in which the major proportion of the polymerizable constituents consists of indene, styrene and their homologs, at least 20% being homologs of styrene and not more than 5% being styrene, the steps that comprise heating the oil to effect polymerization to resin polymer of about 20% to 60% of the polymerizable constituents of the oil by means of heat alone, treating unpolymerized constituents of the oil with a resin-producing catalyst to form catalytic resin polymer from substantially all the remaining polymerizable monomer, and blending the product of heat polymerization with the product of catalytic polymerization to form a solid blended resin.

8. In a process for production of a resin from a resin oil boiling within the range of about 150° to 205° C. in which the major proportion of the polymerizable constituents consists of indene, coumarone, styrene and their homologs, at least 20% being homologs of styrene and not more than 5% being styrene, the steps that comprise heating the oil and maintaining it in the temperature range of about 150° to 200° C. to effect polymerization to resin polymer of about 20% to 60% of the polymerizable constituents of the oil by means of heat alone, distilling the partially polymerized oil to remove the unpolymerized portion of the oil as distillate and obtain the heat polymerized resin as residue, treating the unpolymerized portion of the oil with sulfuric acid polymerization catalyst to form catalytic resin polymer from substantially all the polymerizable constituents remaining unpolymerized after the heat polymerization, and blending the heat polymerized resin with the catalytically polymerized resin to produce a blended resin of melting point above 115° C.

9. In a process for production of a resin from a resin oil boiling within the range of about 150° to 205° C. in which the major proportion of the polymerizable constituents consists of indene, coumarone, styrene and their homologs, at least 20% being homologs of styrene and not more than 5% being styrene, the steps that comprise heating the oil and maintaining it in the temperature range of about 150° to 200° C. to effect polymerization to resin polymer of about 20% to 60% of the polymerizable constituents of the oil by means of heat alone, distilling the partially polymerized oil to remove the unpolymerized portion of the oil as distillate and obtain the heat polymerized resin as residue, treating the unpolymerized portion of the oil with activated clay polymerization catalyst to form catalytic resin polymer from substantially all the polymerizable constituents remaining unpolymerized after the heat polymerization, and blending the heat polymerized resin with the catalytically polymerized resin to product a blended resin of melting point above 115° C.

EDWIN LOUIS CLINE.